D. E. CARRIERE.
CHUCK.
APPLICATION FILED SEPT. 27, 1920.

1,396,022.

Patented Nov. 8, 1921.

Inventor.
Donald E. Carriere
by H. J. S. Dennison
atty.

UNITED STATES PATENT OFFICE.

DONALD EMERY CARRIERE, OF CAPREOL, ONTARIO, CANADA.

CHUCK.

1,396,022.   Specification of Letters Patent.   Patented Nov. 8, 1921.

Application filed September 27, 1920. Serial No. 413,065.

*To all whom it may concern:*

Be it known that I, DONALD EMERY CARRIERE, a subject of the King of Great Britain, and resident of the town of Capreol, of the district of Nipissing, of the Dominion of Canada, have invented certain new and useful Improvements in Chucks, described in the following specification and illustrated in the accompanying drawings, that form part of the same.

The principal objects of this invention are, to facilitate the work of boring small diameter holes by maintaining a support for the drill close to the cutting end, thereby enabling greater pressure being applied to the drill to effect quicker cutting and further to insure accuracy in the boring of small holes.

The principal feature of the invention consists in the novel construction of the chuck, whereby the drill or shaft is supported adjacent to the working end by a jaw member slidably connected with the main portion of the chuck and said extension jaw member is adapted to operate with the main jaw member in gripping the drill or shaft held therein.

In the drawings, Figure 1 is a side elevational view of my improved chuck.

Figure 1:
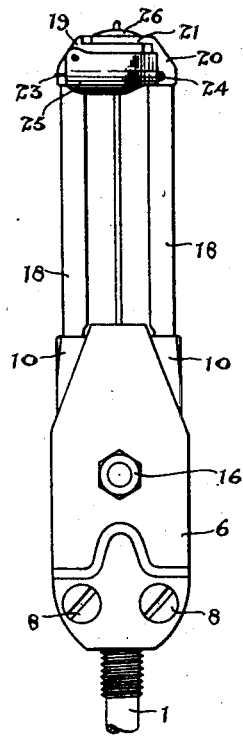
Figure 2:
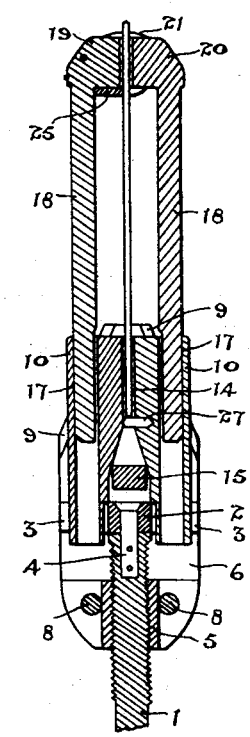
Fig. 2 is a longitudinal sectional view of the chuck.
Figure 3:
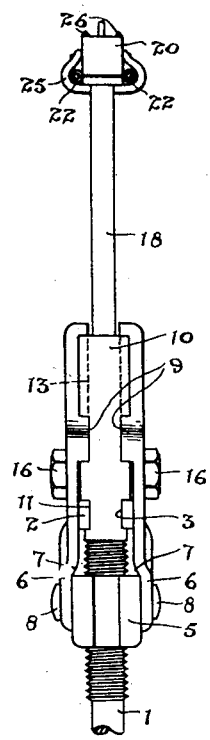
Fig. 3 is a longitudinal elevational view taken at right angles to Fig. 1.
Figure 4:
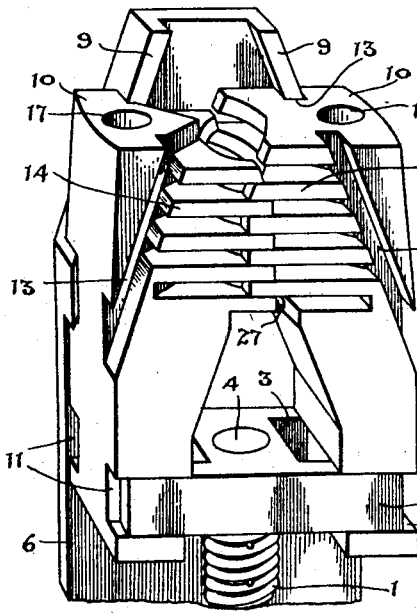
Fig. 4 is an enlarged perspective detail of the main gripping jaws.
Figure 5:
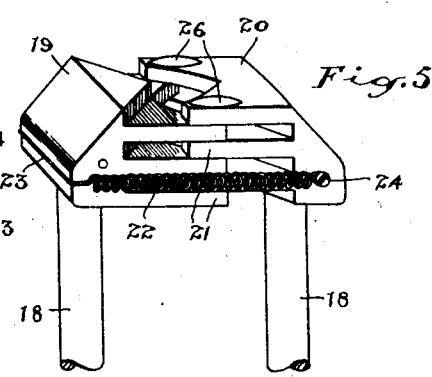
Fig. 5 is an enlarged perspective detail of the supplementary gripping jaws.

In the construction of my improved chuck the spindle 1 is threaded and has pivotally secured to its outer end a block 2 which is of an H shape having the slots 3 at each end, the block being secured in place by the countersunk head pin 4.

A block 5 also of an H shape is threaded on to the threaded portion of the spindle 1 and to each side of said block is secured a side plate 6, the plate being offset inwardly forming shoulders 7 which abut the top edge of the block 5 and hold the sides rigidly in place. The plates are secured by means of cap screws 8.

At the upper ends the plates 6 are formed with the inwardly turned convergent flanges 9. A pair of jaw members 10 are arranged between the side plates 6 and are formed with channeled lower ends 11 which fit into the slots 3 in the block 2 and convergently arranged grooves 13 are cut in the side faces of the jaw members to receive the converging flanges 9 and the blocks sliding between the plates are thus moved together or drawn apart by sliding on the said convergent flanges.

The jaw members are each formed with horizontally arranged teeth 14 which intermesh, the teeth of one jaw sliding between the teeth of the other and these jaws are cut in a V shape on their meeting edges, thus each presenting a V-shaped gripping surface adapted to engage the shaft or drill to be held therein.

It will be seen that by the rotation of the spindle 1 in the block 5 the jaw members will be moved outwardly or inwardly according to the direction of rotation and as they are moved inwardly or outwardly they slide upon the convergent flanges 9 and are drawn in together or separated.

A shouldered cross bolt 15 is arranged between the side plates 6 about midway of the length of said plates, nuts 16 being secured upon the outer ends.

Each of the jaw members 10 has a cylindrical hole 17 bored longitudinally thereof and in these holes are slidably arranged a pair of rods 18 which have formed or secured to their outer ends the jaw heads 19 and 20. These jaw heads are preferably formed with intermeshing teeth 21 having their meeting edges cut V shape to engage the shaft or drill and to grip it simultaneously with the gripping of the jaws 10.

A pair of coil springs 22 are connected together at one end by the loop 23 which loop fits in a groove in the outer side of the head 19 and the springs extend to the sides of the heads, the free ends being secured to screws 24 on the head 20, thus spring holding the heads toward each other and forming a spring grip.

A pressed steel casing 25 is secured to the head 19 having a portion extending underneath the same and the side portions thereof extend outwardly to inclose the springs 22 protecting them from injury and to keep them from being fouled by chips from the work. It also keeps the jaws in alinement.

A pair of bosses 26 are formed on the outer face of the jaw 20 so that when the chuck is being used for drilling, these bosses will engage the work when the drill is pushed into the limit and will provide a space to allow the cuttings to escape.

A small pin 27 is arranged in one of the main jaws 10 against which the butt of the drill or shaft to be held in the chuck is abutted.

A chuck constructed as described is particularly adapted for use in the drilling of small holes where they are required to be sunk to a considerable depth and by its use the holes may be bored with much greater accuracy and also at greater speed as the extension jaws support the drill at a point close to the work and thereby prevent its bending under the pressure applied thereto. By reason of this arrangement a much greater than ordinary pressure can be placed upon the drill and consequently the work can be accomplished in less time.

In operation the butt of the drill is placed between the jaws of the extension chuck and pushed through into the main chuck. The chuck is then turned on the spindle 1 and both sets of jaws are drawn inwardly to grip the drill. The outer jaws will not of course grip the drill as tightly as the inner jaws but they will grip sufficiently tight to steady the drill and prevent bending and as the drill enters into the work the projecting bosses 26 engage the face thereof and the extension jaws slipping over the drill allow the drill to advance into the work, the rods 18 receding into the main chuck.

The chuck may be used effectively in turning small shafts or spindles very effectively, as it will support the outer end which is being worked upon in an effective manner and its use will effect a very great saving in tools and material by preventing breakages which with small drills runs to a very high percentage in ordinary work. The chuck may be used without the extension member if desired and the construction of the extension member enables its removal in a very rapid manner, it being simply necessary to pull it up.

The telescopic feature enables the very quick adjustment of the extension member and allows of its use in many ways as it requires no adjustment during operation but adjusts automatically.

What I claim as my invention is:—

1. In a chuck, the combination with the movable jaws, of extensible jaw members carried by said jaws and adapted to support the tool gripped between the said movable jaws at a point beyond their length.

2. In a chuck, the combination with the movable jaw members, of members telescopically arranged in each of said jaw members and adapted to be extended in parallel relation thereto, and jaw members carried at the other ends of said telescopic members adapted to grip the tool.

3. A chuck having jaw members formed with longitudinal parallelly arranged guideways, rods slidably arranged in said parallel guideways and jaws secured to the outer ends of said rods and adapted to grip the tool secured in the main chuck jaws simultaneously therewith.

4. A chuck having a pair of jaw members adapted to move in parallel relation in opening and closing and each having a longitudinal guideway, a pair of rods slidably arranged one in each of said guideways and extending parallel from said jaws, jaws on the outer ends of said rods adapted to grip the tool held in the main chuck, and spring means for holding the outer jaws in close contact.

5. In a chuck, the combination with a pair of jaws adapted to be moved longitudinally in parallel relation the one to the other and having longitudinal parallelly arranged guideways, of a pair of rods slidably arranged in said guideways and extending parallelly beyond the chuck jaws, jaw heads arranged upon the outer ends of said rods having transversely arranged intermeshing teeth, said teeth having their adjacent end surfaces cut with longitudinal V-shaped grooves, and spring means for holding the latter jaws toward each other.

6. In a chuck, the combination with a pair of jaws adapted to be moved longitudinally in parallel relation the one to the other and having longitudinal parallelly arranged guideways, of a pair of rods slidably arranged in said guideways and extending parallelly beyond the chuck jaws, jaw heads arranged on the outer ends of said rods and having parallelly arranged V-shaped adjacent surfaces, spiral tension springs arranged at the sides of said jaws and exerting an inward pressure, and a guard casing extending outside of said springs.

DONALD EMERY CARRIERE.